United States Patent
Egbert

(10) Patent No.: US 7,315,248 B2
(45) Date of Patent: Jan. 1, 2008

(54) RADIO FREQUENCY IDENTIFICATION TAGS FOR USE ON METAL OR OTHER CONDUCTIVE OBJECTS

(75) Inventor: William C. Egbert, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 11/128,713

(22) Filed: May 13, 2005

(65) Prior Publication Data
US 2006/0255945 A1 Nov. 16, 2006

(51) Int. Cl.
*G08B 13/14* (2006.01)
(52) U.S. Cl. .............................. 340/572.7; 340/10.34; 340/551; 343/872; 235/497; 235/488
(58) Field of Classification Search ............. 340/572.7, 340/572.8, 572.5, 551, 572.1, 10.34; 343/872, 343/873; 235/497, 487, 492, 441, 486, 488, 235/450, 451
See application file for complete search history.

(56) References Cited

U.S. PATENT DOCUMENTS

| | | | |
|---|---|---|---|
| 5,925,455 A | 7/1999 | Bruzzone et al. | |
| 6,127,989 A | 10/2000 | Kunz | |
| 6,163,260 A | 12/2000 | Conwell et al. | |
| 6,307,517 B1 | 10/2001 | Lee | |
| 6,371,380 B1 * | 4/2002 | Tanimura | 235/492 |
| 6,400,323 B2 * | 6/2002 | Yasukawa et al. | 343/700 MS |
| 6,424,263 B1 * | 7/2002 | Lee et al. | 340/572.7 |
| 6,476,775 B1 * | 11/2002 | Oberle | 343/895 |
| 6,693,541 B2 | 2/2004 | Egbert | |
| 6,869,821 B2 * | 3/2005 | Knipp et al. | 438/99 |
| 2005/0104796 A1 | 5/2005 | Piettner et al. | |

FOREIGN PATENT DOCUMENTS

| | | |
|---|---|---|
| AU | 2003244560 A1 | 10/2003 |
| EP | 1 045 526 | 10/2000 |
| EP | 1 061 663 | 12/2000 |
| EP | 1 347 533 A1 | 9/2003 |
| WO | WO 96/31091 | 10/1996 |
| WO | WO 03/030093 * | 4/2003 |
| WO | WO 03/067512 | 8/2003 |

OTHER PUBLICATIONS

Finkenzeller, K., *RFID Handbook, Radio-Frequency Identification Fundamentals and Applications*; 1999 John Wiley & Sons Ltd., Chichester, West Sussex, England, pp. 16-17, 21, 64, 101-102.

(Continued)

*Primary Examiner*—Benjamin C. Lee
*Assistant Examiner*—Daniel Previl
(74) *Attorney, Agent, or Firm*—Melissa E. Buss

(57) ABSTRACT

A radio frequency identification ("RFID") tags that are useful on metal or other conductive surface and to methods for manufacturing the same. In one embodiment, the radio frequency identification tag includes: a substrate including a first major surface and a second major surface opposite the first major surface; a radio frequency identification antenna attached to the first major surface of the substrate; an integrated circuit attached to the antenna; and a first composite layer.

35 Claims, 5 Drawing Sheets

OTHER PUBLICATIONS

Slater, John C. and Frank, Nathaniel H., "Electromagnetism", Dover Publications, New York, 1969, pp. 78-80.

"Soft Magnetics Application Guide", published by Arnold Magnetic Technologies Corporation, Rochester, NY, Feb. 2003 Rev B., p. 30-1.

Brochure entitled, "Emerson & Cuming Microwave Products Introduces New Thin Smart Tag Insulators For Read On Metal", Oct. 13, 2004, 1 page.

Safety Data brochure entitle, "ECOSORB® FGM—Thin, Flexible, Impervious, Broadband Absorbers", Emerson & Cuming Microwave Products, Nov. 12, 2002, 4 pages.

Information from internet entitled, "Soft Magnetic Materials", Arnold Magnetic Technologies, printed May 12, 2005, 1 page.

Information from internet entitled, "Powder Core Catalogs", Arnold Magnetic Technologies, printed May 12, 2005, 2 pages.

Information from internet entitled, "Powder Cores", Arnold Magnetic Technologies, printed May 12, 2005, 1 page.

Information from internet entitled, "News Flash", Arnold Magnetic Technologies, printed May 12, 2005, 1 page.

Magnetics Technology Center—Glossary, Arnold Magnetic Technologies, printed May 12, 2005, 3 pages.

3M™ Digital Library Assistant Model 702, "Open the door to all the benefits of 3M™ Tattle-Tape™ System with RFID with this little tag!", printed May 12, 2005, 2 pages.

Article entitled, "Boeing, Airbus Use RFID to Track Airplane Parts", RFID Gazette, Nov. 23, 2004, 1 page.

Article entitled, "RFID Tags Fly With Airplane Parts", Information Week, Nov. 22, 2004, 3 pages.

Article entitled, "UHF Tags to be Tested on Planes", RFID Journal, printed Feb. 24, 2005, 3 pages.

* cited by examiner

RADIO FREQUENCY IDENTIFICATION TAGS FOR USE ON METAL OR OTHER CONDUCTIVE OBJECTS

TECHNICAL FIELD

The present invention relates to radio frequency identification ("RFID") tags that are useful on metal or other conductive objects and to methods for manufacturing the same. The present invention relates more particularly to a radio frequency identification tag, including: a substrate including a first major surface and a second major surface opposite the first major surface; a radio frequency identification antenna attached to the first major surface of the substrate; an integrated circuit attached to the antenna; and a first composite layer.

BACKGROUND OF THE INVENTION

Various methods have been developed to help reduce or eliminate interference problems when a radio frequency identification ("RFID") tag is proximate or adjacent a conductive object, such as a metal object. Using some of these methods, it is possible for an RFID reader to properly read the RFID tag, despite its location next to the conductive object. Examples of such methods are disclosed in the following publications and patent: PCT Publication WO 03/030093 (Gschwindt), "Transponder Label and Method for the Production Thereof;" PCT Publication WO 03/067512 (Surkau), "Transponder Label;" and U.S. Pat. No. 6,371,380 (Tanimura), "Non-Contacing-Type Information Storing Device". In addition, there are commercially available spacer materials for use in RFID tags to help reduce or eliminate interference problems. For example, one type of commercially available material is broadband absorbers available from Emerson & Cuming based in Randolph, Mass. under the trade name ECCOSORB.

SUMMARY OF THE INVENTION

One embodiment of the present invention provides a radio frequency identification RFID tag. In this embodiment, the RFID tag comprises: a substrate including a first major surface and a second major surface opposite the first major surface; a radio frequency identification antenna attached to the first major surface of the substrate; an integrated circuit attached to the antenna; and a first composite layer including a first major surface and a second major surface opposite the first major surface, wherein the first composite layer is attached to the second major surface of the substrate, wherein the first composite layer comprises: binder; and a plurality of multilayered flakes dispersed in the binder, the multilayered flakes comprising two to about 100 layer pairs, each layer pair comprising: one crystalline ferromagnetic metal layer, adjacent to one dielectric layer wherein the layer pairs form a stack of alternating ferromagnetic metal layers and dielectric layers.

Another embodiment of the present invention provides a method of manufacturing a radio frequency identification ("RFID") tag. In this embodiment, the method comprises the steps of: providing a substrate containing an antenna on at least one surface of the substrate; attaching an integrated circuit to the antenna; providing a first composite layer including a first major surface and a second major surface opposite the first major surface, wherein the first composite layer is attached to the second major surface of the substrate, wherein the first composite layer comprises: binder; and a plurality of multilayered flakes dispersed in the binder, the multilayered flakes comprising two to about 100 layer pairs, each layer pair comprising: one crystalline ferromagnetic metal layer adjacent to one dielectric layer, wherein the layer pairs form a stack of alternating ferromagnetic metal layers and dielectric layers; and attaching the first composite layer to the substrate opposite the antenna and integrated circuit.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

I. RFID Tags and Readers

Figure 1:
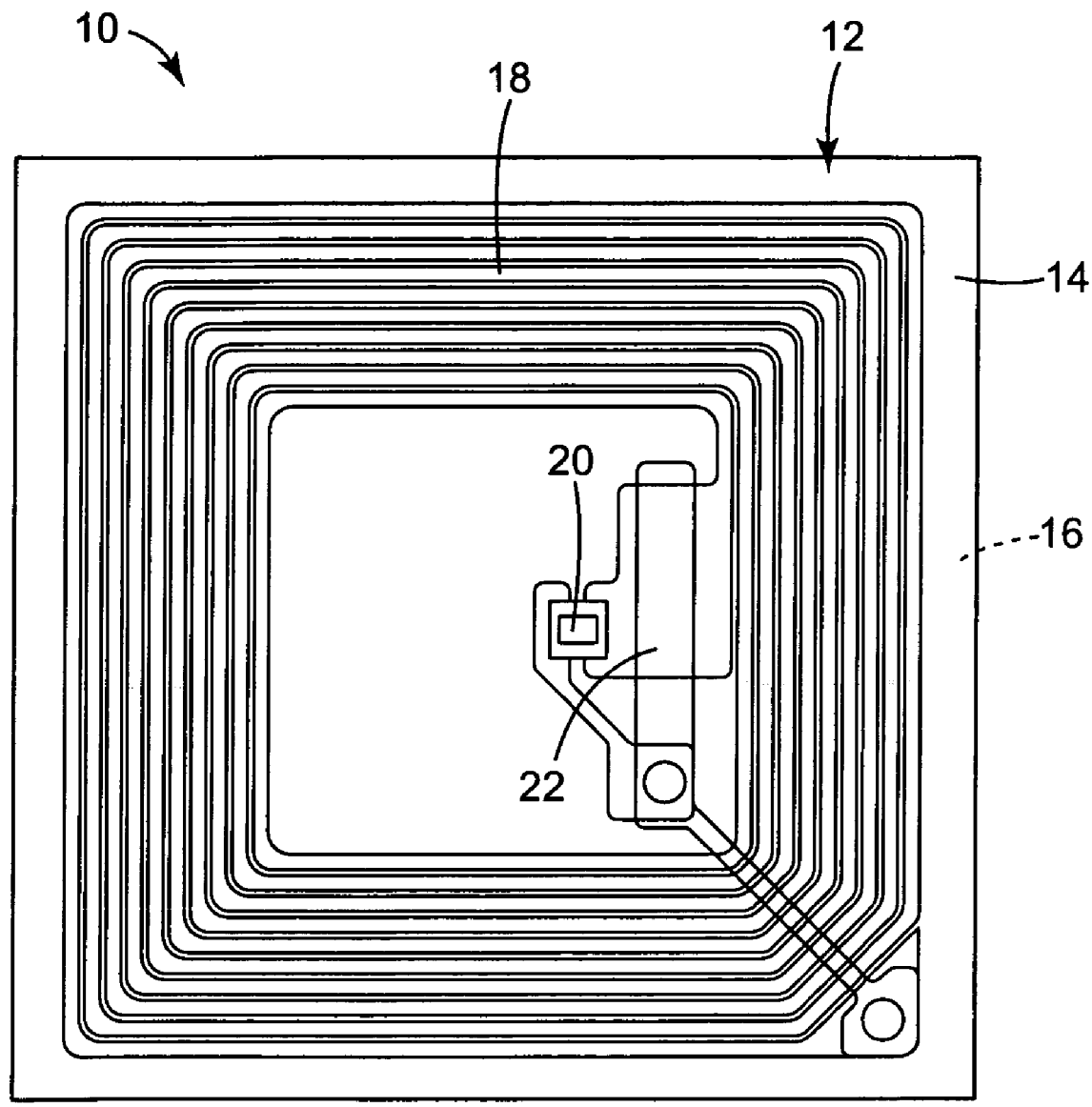
FIG. 1 is a top view of a typical radio frequency identification ("RFID") tag known in the art.

This section describes typical radio frequency identification ("RFID") tags and readers, as are well known in the art. FIG. 1 illustrates a typical radio frequency identification ("RFID") tag 10. The RFID tag 10 includes a substrate 12 having a first major surface 14 and a second major surface 16 opposite the first major surface 14. Preferably the substrate 12 is a flexible substrate, such that it could be used in a label that may be wrapped around an object. The flexible substrate 12 could have enough flexibility to conform to a variety of surfaces and bend easily around objects. For example, the substrate 12 is preferably in the range of 25-100 microns in thickness, and is made of a flexible material, such as polyester, polyethylene naphthanate, polyimide, polypropylene, paper, or other flexible materials apparent to those skilled in the art.

An RFID element is attached to the first major surface 14 of the substrate 12. The RFID element typically includes two major components: an integrated circuit 20 and an antenna 18. The integrated circuit 20 provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID tags 10 include those available from Texas Instruments (in their line of products under the trade names TIRIS or TAG-IT), Philips (in their line of products under the trade names I-CODE, MIFARE and HITAG), among others.

The antenna 18 geometry and properties depend on the desired operating frequency of the RFID tag 20. For example, 915 MHz or 2.45 GHz RFID tags 10 would typically include a dipole antenna, such as a linear dipole antenna or a folded dipole antenna. A 13.56 MHz (or similar) RFID tag 10 would typically use a spiral or coil antenna 18, as shown in FIG. 1. However, other antenna designs are known to those skilled in the art. In either case, the antenna 18 intercepts the radio frequency energy radiated by an interrogation source, such as the RFID reader 60 illustrated schematically in FIG. 2. (Reference number 62 illustrates the radio frequency energy radiated by the RFID reader 60.) This signal energy 62 carries both power and commands to the tag 10. The antenna enables the RF-responsive element to absorb energy sufficient to power the integrated circuit 20 and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. Typically, metals such as copper or aluminum would be used, but other conductors, including printed inks, are also acceptable. It is also important that the input impedance of the selected integrated circuit match the impedance of the antenna for maximum energy transfer. Additional information about antennas is known to those of ordinary skill in the art, for example, in reference texts such as *RFID Handbook, Radio-Frequency Identification Fundamentals and Applications*, by K. Finkenzeller, (1999 John Wiley & Sons Ltd, Chichester, West Sussex, England).

A capacitor 22 is often included to increase the performance of the RFID tag 10. The capacitor 22, when present, tunes the operating frequency of the tag to a particular value. This is desirable for obtaining maximum operating range and insuring compliance with regulatory requirements. The capacitor may either be a discrete component, or integrated into the antenna 18.

Figure 2:
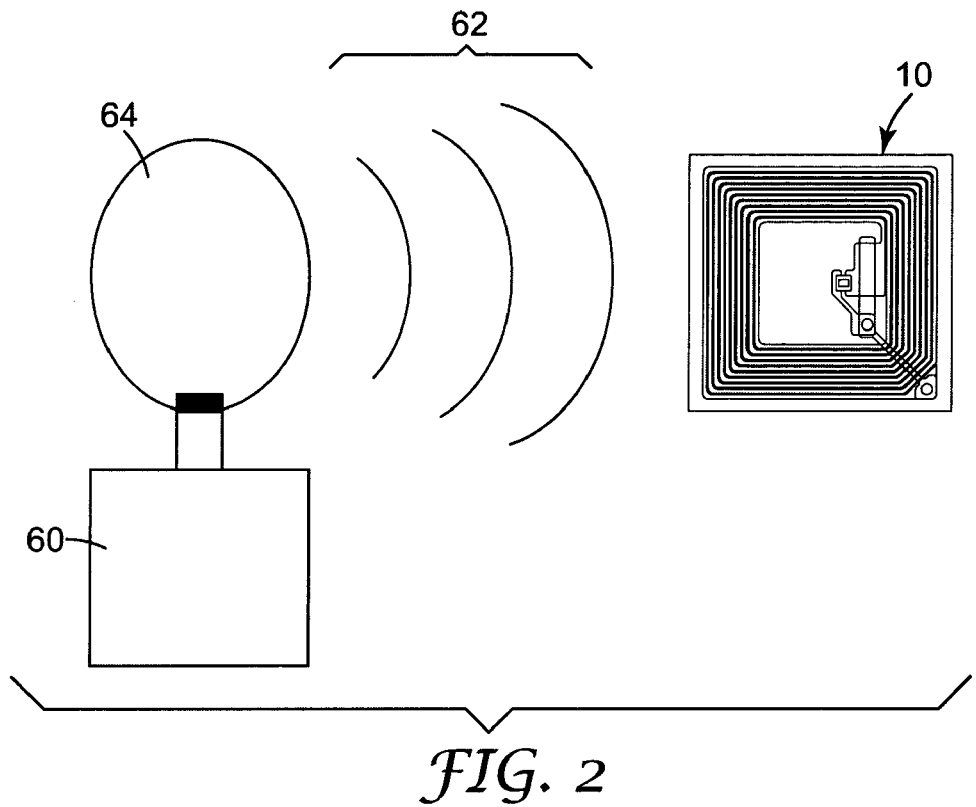
FIG. 2 is a schematic view of interactions between the RFID tag of FIG. 1 and a RFID reader.

An RFID reader or interrogator 60 is schematically illustrated in FIG. 2. The RFID reader 60 includes an RFID reader antenna 64. RFID readers 60 are well known in the art. For example, commercially available RFID readers are available from 3M Company based in St. Paul, as the 3M™ Digital Library Assistant as model numbers 702, 703, 802, and 803. Another example of a commercially available RFID reader is a model IP3 portable RFID (UHF) Reader attached to an Intermec™ 700 Series Mobile computer available from Intermec Technologies Corporation, Everett, Wash.

The RFID reader 60 and RFID tag 10 form an RFID system. Inductively coupled RFID systems are based on near-field magnetic coupling between the antenna loop of the RFID reader and the antenna coil of the RFID transponder, according to *RFID Handbook, Radio-Frequency Identification Fundamentals and Applications*, by K. Finkenzeller, (1999 John Wiley & Sons Ltd, Chichester, West Sussex, England) pp. 21. A number of RFID systems are available, following one of several communication and system performance standards. The discussion below is principally based on RFID systems operating at 13.56 MHz, but the discussion extends to inductively coupled RFID systems at other operating frequencies.

Figure 3:
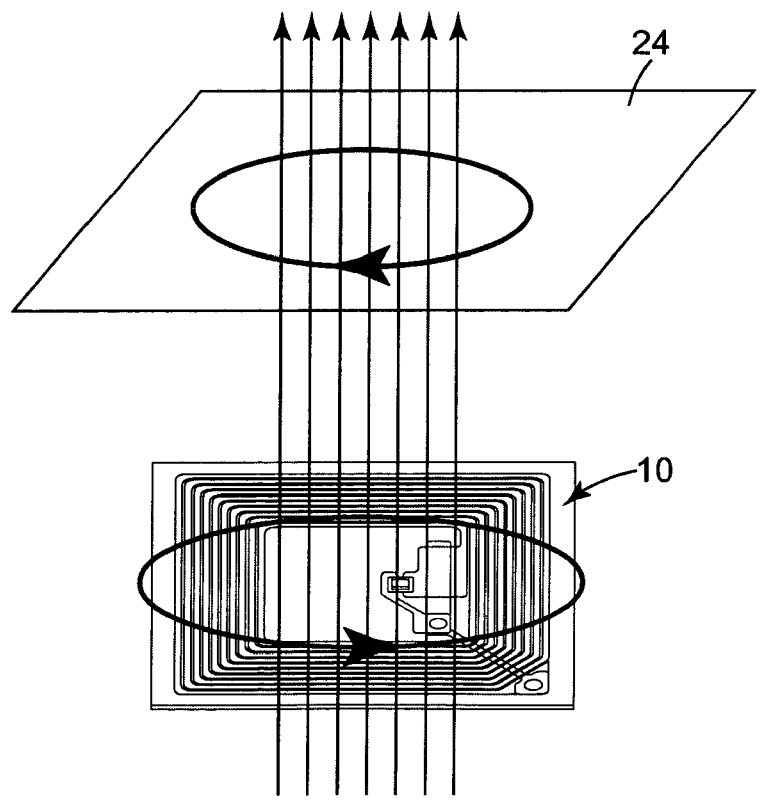
FIG. 3 illustrates the interaction between the RFID tag of FIG. 1 and a conductive object.
Figure 4:
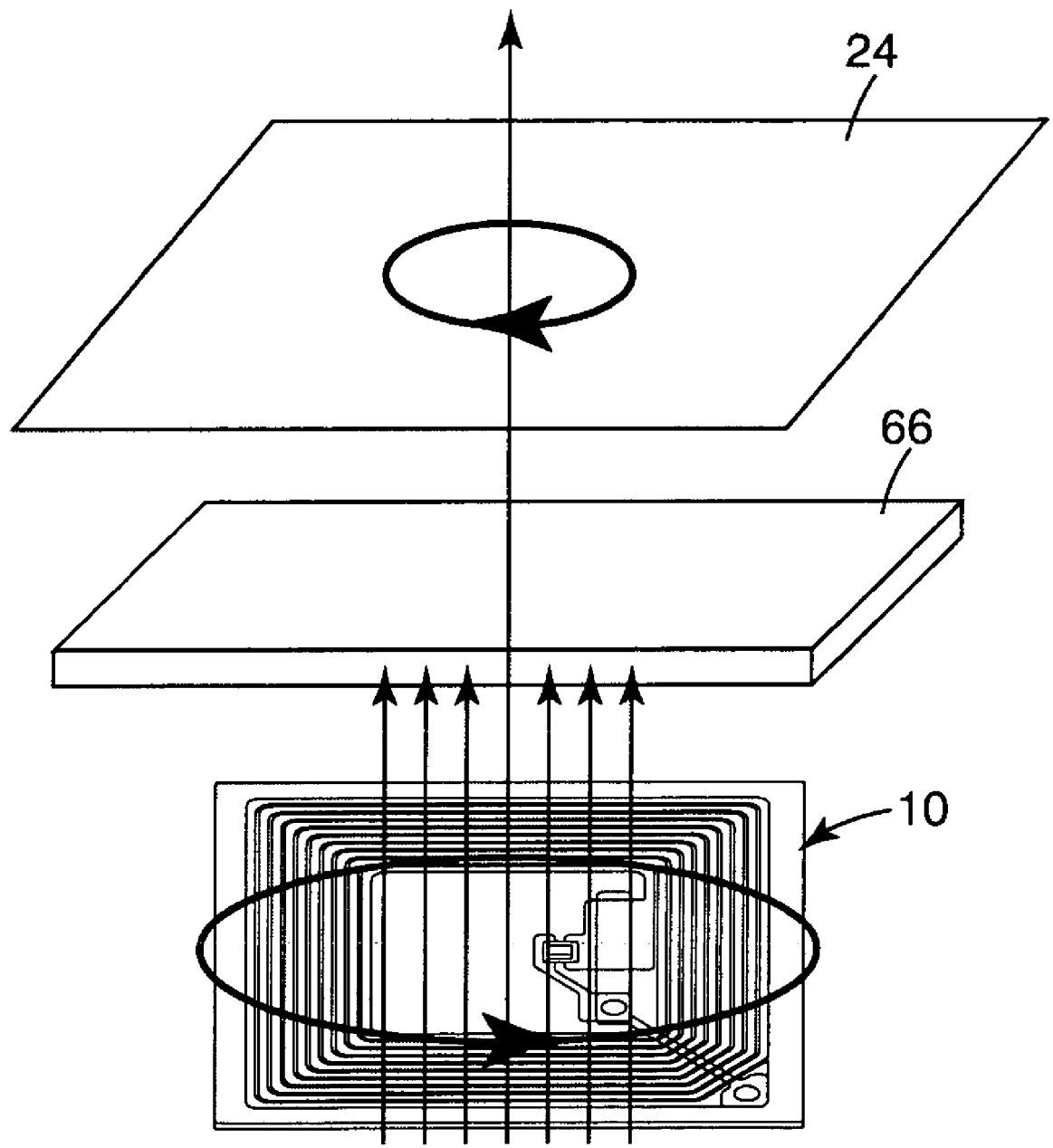
FIG. 4 illustrates the interaction between the RFID tag and conductive object of FIG. 3 and prior art spacers.

II. Interference Problems When RFID Tags are in Close Proximity with Conductive Objects This section describes the typical interactions between RFID tags and RFID readers, and the interference problems typically encountered when RFID tags are in close proximity to conductive objects. FIG. 2 illustrates the RFID reader 60 interrogating an RFID tag 10 that is not located close to a conductive object. FIG. 3 illustrates the interrogation of an RFID tag 10 in close proximity to a conductive object 24. Examples of conductive objects 24 include objects containing metal, nonmetallic substances (e.g., carbon-fiber based composite), or liquid (e.g., an aqueous ionic solution in a bottle). For example, a conductive object could include a metal airplane part or tool. FIG. 4 illustrates the interrogation of the RFID tag 10 in close proximity to the conductive object 24 with a prior art spacer layer 66 located between the RFID tag 10 and the conductive object 24.

As illustrated in FIG. 2, the RFID reader 60 interrogates the RFID tag 10 and as a consequence, the RFID reader 60 produces a time-varying electrical current in the RFID reader antenna 18. The variations in electrical current may be the smoothly varying sinusoidal carrier frequency, or the variations may be aperiodic and non-repetitive variations in amplitude, frequency, or phase of the sinusoidal carrier frequency representing encoded digital data. The time-varying electrical current produces a electromagnetic field, which extends through space to the RFID antenna 18. The time-varying magnetic flux through the RFID antenna 18 induces an electromotive force (EMF) in the RFID antenna 18, according to Faraday's Law of Induction, which is described in more detail in *Electromagnetism* by John C. Slater and Nathaniel H. Frank, (1969 Dover Publications, New York), pp. 78-80. The induced EMF appears as an effective induced voltage across the two end terminals of the RFID antenna 18, hence giving the classification known in the art as an "inductively coupled RFID system." The induced voltage drives a time-varying electrical current through the RFID integrated circuit 20, thereby completing the RFID communication link from the RFID reader 60 to the RFID tag 10.

When, as illustrated in FIG. 3, the RFID antenna 18 is not in free space, but is adjacent to an item with finite electrical conductivity, such as a conductive object 24, the EMF induced in the RFID transponder antenna is reduced, generally to a level at which the tag is not able to respond. This occurs when situations such as that illustrated by FIG. 3 occur, i.e. when the plane of the RFID antenna 18 is substantially parallel with and proximate to the surface of the conductive object 24. This might be the case if, for example, the RFID tag 10 is attached to the conductive object 24 as a label to identify the object. According to Faraday's Law of Induction, eddy currents will be induced in the conductive object, as discussed in more detail in *Electromagnetism* by John C. Slater and Nathaniel H. Frank, (1969 Dover Publications, New York) pp. 78-80. According to Lenz's Law, the net effect of the eddy currents is to reduce the magnetic flux near the conductive object, as discussed in more detail in the *RFID Handbook. Radio-Frequency Iden-*

*tification Fundamentals and Applications*, by K. Finkenzeller, (1999 John Wiley & Sons Ltd, Chichester, West Sussex, England) p.64. The reduced net magnetic flux near the conductive object results in a reduced EMF in the RFID transponder antenna, compared to the first case illustrated in FIG. 2, where the RFID antenna 18 was in free space.

If the RFID reader 60 is transmitting a time-varying electromagnetic field, the RFID tag 10 will intercept this time-varying electromagnetic field. As a consequence of the RFID tag 10 being adjacent the conductive object 24, an EMF is induced in the RFID antenna 18 and an induced electrical current circulates in the RFID integrated circuit 20, as described above. The electrical current circulating in the RFID tag 10 will induce an eddy current in the substrate of the conductive object 24. The magnitude of the induced eddy current depends in part on the amount of electromagnetic energy reaching the conductive substrate. If this amount of electromagnetic energy is decreased, the magnitude of the induced eddy current in the conductive object will proportionately decrease.

If the antenna 18 of the RFID tag 10 is a rectilinear antenna, as illustrated in FIG. 4, then the conductors that comprise the antenna 18 are essentially long straight conductors, connected at each end to adjacent conductors to form a loosely coiled antenna form. The electrical current I in each long straight portion of each conductor in the RFID antenna 18 sets up a magnetic field H at a distance r away from each portion respectively, where $\mu_0$ is the permeability in free space according to the following formula:

$$H = \mu_0 I / (2\pi r)$$

If the RFID tag 10 is proximate or adjacent to the conductive object 24, the magnetic fields generated by each conductor segment will induce a counter-circulating eddy current in the conductive object 24, as illustrated by the clockwise arrow. The strength of the induced eddy current depends on the amount of magnetic field energy coupled into the conductive substrate. If the RFID tag 10 is attached to the conductive object 10, for example by a thin layer of adhesive, the energy coupled from the RFID tag 10 to the conductive object 24 will be large and the induced eddy current will be correspondingly large. If the eddy current is similar in magnitude to the RFID tag 10 current, but opposite in direction, the sum of the transponder current and the eddy current will be essentially zero and the RFID tag 10 will not be detected by the RFID reader 60. This physical phenomenon is often referred to by those skilled in the art as "interference problems" when RFID tags are in close proximity with conductive objects such as metal objects.

Various methods are known by those skilled in the art to help reduce or eliminate the interference problems described above when an RFID tag is proximate or adjacent a conductive object. Using some of these methods, it is possible for an RFID reader to properly read the RFID tag, despite its location next to the conductive object. Various methods described in the prior art literature may be used to electromagnetically decouple the RFID transponder from the conductive surface. Examples of such methods are disclosed in the following publications and patent: PCT Publication WO 03/030093 (Gschwindt), "Transponder Label and Method for the Production Thereof,"; PCT Publication WO 03/067512 (Surkau), "Transponder Label"; and U.S. Pat. No. 6,371,380 (Tanimura), "Non-Contacing-Type Information Storing Device". WO 03/030093 describes a shielding layer that has ferrite particles embedded therein. WO 03/067512 also describes a shielding film that has ferrite particles embedded therein. Ferrite particles are inorganic compounds containing iron in one of its natural oxidation states ($Fe3+$) chemically bound with oxygen and other chemical elements. Typically, the ferrite particles are uniform in composition throughout the particle, and homogenous, for example, the ferrite compound is the same throughout the full depth of the particle. U.S. Pat. No. 6,371,380 describes using a magnetism absorbing plate formed from Sendust. Although not stated in the '380 patent, it is known in the industry that Sendust is made from a ferrous alloy powder. The base material is approximately 85% iron, 6% aluminum, and 9% silicon. (See for example *Soft Magnetics Application Guide* published by Arnold Magnetic Technologies Corporation, Rochester, N.Y., p. 30-1, February 2003 Rev. B.)

FIG. 4 illustrates an example of these prior art methods. As illustrated in FIG. 4, the RFID tag 10 is electromagnetically decoupled from the surface of the conductive object 24. A ferrite shield 66 is placed between the RFID antenna 18 and the conductive object surface 24. The RFID tag 10 may be attached to an electromagnetic ferrite shield 66, which may in turn be attached to the surface of the conductive object 24. The ferrite shield 66 will minimize the occurrence of eddy currents induced in the conductive object 24 and the consequent reduction of induced EMF in the RFID antenna 18, as illustrated graphically in FIG. 4. In other words, the electromagnetic ferrite shield 66 is not electrically conductive, so it will not support eddy currents in the presence of a time-varying magnetic field. It is noted too that the proximity of the ferrite material may load the antenna 18 and increase its inductance to such a degree that the resonant frequency of the RFID tag 10 will need to be adjusted. (Klaus Finkenzeller, *RFID Handbook*, John Wiley & Son, Ltd., Chichester (1999), pp. 101-102.) A further claimed advantage of ferrites is the high electrical resistivity, on the order of $1 \times 10^6$ $\Omega$-m, compared to metallic resistivity in the range of $1 \times 10^{-5}$ to $1 \times 10^{-4}$ $\Omega$-m. Because of the intrinsic high resistivity of ferrite materials, eddy currents are not a factor and consequently the loss of energy in eddy currents is also low. Other prior art methods teach RFID transponders wound on ferrite cores and encased in plastic designed to mark tools and metal gas bottles. (Klaus Finkenzeller, *RFID Handbook*, John Wiley & Son, Ltd., Chichester (1999), pp. 16-17.)

One of the disadvantages of the approach that uses the shields with ferrite particles or other iron-based, magnetic particulates embedded in such shields to help reduce or eliminate the interference problems described above is that often these shields will contribute a large amount of mass or weight to the overall RFID tag. Ferrites are typically heavy, bulky, and rigid. In addition, such shields will often have a relatively high areal density (i.e., mass per unit area) and tend to be much thicker than other materials typically found in an RFID tag. In particular applications, this additional weight or additional thickness added to the RFID tags tends to be disadvantageous. For example, if particular parts in an airplane have an RFID tag with a ferrite shield attached to them, the resulting increase in weight added to the airplane may affect how the airplane ultimately functions.

Boeing and Airbus propose to use RFID labels to track their airplane parts to improve maintenance and replacement services. It is proposed that passive RFID tags be attached to removable parts on new jets. The RFID labels may contain information stored on the integrated chip related to the part it is attached to, for example, part and serial numbers, manufacturer codes, country of origin, date of installation and maintenance, and inspection information.

This information can be particularly useful in the maintenance of the airplanes because the service history of the part is stored on the RFID label as it goes through different stages of its life cycle. However, most of the airplane parts tend to include metal, and often the RFID tag or label will be attached to the part giving rise to interference problems discussed above. As discussed above, when the RFID tags or labels are in close proximity to a conductive object, such as a metal airplane part, there tends to be interference problems, as described above, where the RFID reader will be unable to successfully read the RFID tag. Therefore, there is a need to provide an RFID tag or label that helps reduce or eliminate these interference problems when the RFID tag or label is attached to an airplane part, but has a relatively low areal mass density and therefore adds relatively little mass to the overall RFID label. In addition, because airplane parts tend to fit together closely to help streamline the design of the airplane, there is also a need to provide an RFID tag or label that is relatively thin. The examples illustrate the typical mass and areal consistency density of one example of a prior art shield; a shield containing iron particulates in a polymer binder, such as Eccosorb™ material available from Emerson & Cuming, Randolph, Mass., which is required to successfully read an RFID tag with an RFID reader.

Another solution taught in the prior art to help reduce the interference problems is to physically increase the distance between the RFID tag 10 and the vicinity of the conductive object 24. This may be accomplished by inserting a non-conductive, nonmagnetic dielectric physical spacer, for example, polymer film, foam tape, or similar materials between the conductive object 24 and the RFID tag 10. The physical spacer increases the distance between the conductors comprising the RFID antenna 18 and the substrate of the conductive object 24. According to the equation referenced below, $H=\mu_0 I/(2\pi r)$, when the distance r between the RFID antenna 18 and the substrate of the conductive object 24 is increased, the magnetic field intensity H is commensurately reduced at the surface of the conductive object. In this condition, the magnetic field energy coupled to the conductive object is reduced, compared to the case where the RFID tag is directly adjacent the conductive object 24. However, again, the disadvantage of this approach is the additional thickness that is required by the polymer film, foam tape or other similar materials to put adequate distance between the RFID tag and the conductive object to help reduce or eliminate the interference problems. The examples illustrate the typical thicknesses of nonconductive, nonmagnetic, dielectric physical spacers, such as foam core, paper, or polymer films, which are required to successful read an RFID tag adjacent a conductive surface with an RFID reader.

III. RFID Tag of the Present Invention

The RFID tag of the present invention was developed to overcome some of the disadvantages illustrated above in section II. The RFID tag of the present invention includes a composite layer that reduces the magnetic field energy coupled to the conductive object from the RFID tag. The composite layer of this invention is relatively thin compared to prior physical spacer layers with equivalent RFID performance enhancement. The composite layer is also light in weight compared to ferrite spacers known in the art.

Figure 5:
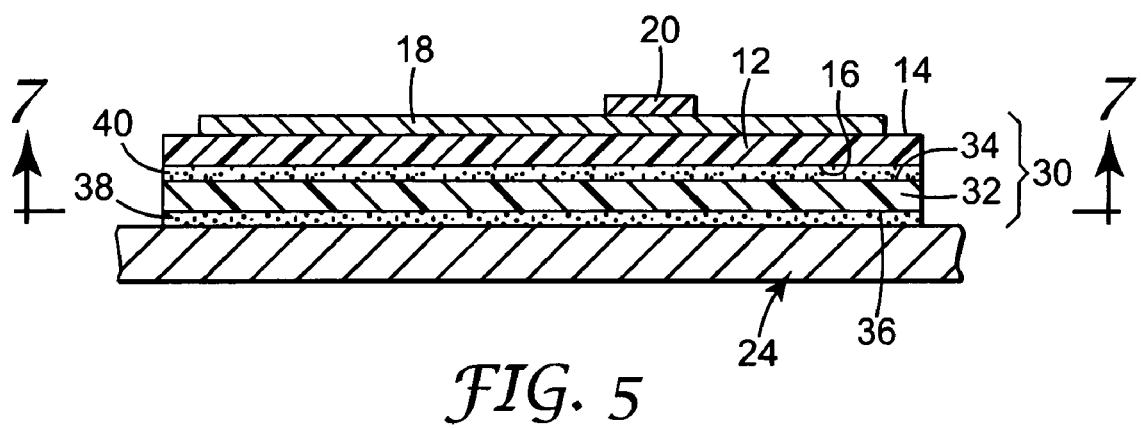
FIG. 5 is a side view of one embodiment of the RFID tag of the present invention.

One embodiment of the RFID tag 30 of the present invention is illustrated in FIG. 5. The RFID tag 30 is shown attached to an item with finite electrical conductivity, such as a conductive object 24. The conductive object 24 may be metallic, nonmetallic (e.g., carbon-fiber based composite), or liquid (e.g., an aqueous ionic solution in a bottle), or any combinations thereof. In one embodiment, the RFID tag 30 is attached to the conductive object 24 by a first layer of adhesive 38. However, the RFID tag 30 may be attached to the conductive object 24 by any known means in the art of attaching items to objects. The first layer of adhesive 38 is useful for attaching the RFID tag 30 to objects, such as airplane parts, tools, metal bins and racks, and other air, land and, sea transportation vehicle parts. In FIG. 5, the second layer of adhesive 40 is opposite from the integrated circuit 20 and antenna 18 on the first major surface 14 of the substrate 12. However, in another embodiment, the integrated circuit 18 and antenna 20 could be on the second major surface 16 of the substrate 12 and in contact with the second layer of adhesive. The RFID tag 30 may also optionally include a liner (not shown) on the first layer of adhesive 38. Suitable liner materials include polyethylene and silicon coated papers. The RFID tag 30 includes the RFID tag 10, which is described in more detail in reference to FIG. 1. The RFID tag 10 is attached to a first spacer layer 32, preferably by a second layer of adhesive 40. However, the RFID tag 10 may be attached to the first spacer layer 32 by any known means in the art of attaching item to objects. The first spacer layer 32 has a first major surface 34 and a second major surface 36 opposite the first major surface 34. The second layer of adhesive 40 is in contact with the second major surface 16 of the substrate 12 of the RFID tag 10 and the first major surface 34 of the first spacer layer 32. The first layer of adhesive 38 is in contact with the second major surface 36 of the first spacer layer 32 and the surface of the conductive object 24.

The first spacer layer 32 is a composite layer, which includes microstructured particles dispersed in a binder. Preferably, the binder is a nonmagnetic, nonconductive binder and the microstructured particles are multilayered flakes. However, the microstructured particles may be of any shape or form.

Preferably, the composite layer 32 includes a thickness between 0.5 and 5.0 mm. More preferably, the composite layer 32 includes a thickness between 0.5 and 2. However, the composite layer 32 may be any thickness suitable for its intended purpose. Preferably, the areal density of the composite layer 32 is between 0.0001 and 0.1 gm/mm². More preferably, the areal density is between 0.0005 and 0.05 gm/mm². However, the composite layer may be any areal density suitable for its intended purpose.

One example of a preferred binder is polyethylene and its copolymers. Alternatively, a variety of polymers or polymer blends such as thermoplastic polymers, thermoplastic elastomers, and thermally activated or accelerated cure polymers may be used as binder material. The binder may also be a polymeric or nonpolymeric adhesive. In some embodiments, the RFID tag 30 may not require additional layers of adhesive 38 and 40. Instead, the RFID tag 30 may only include the RFID tag 10 described in reference to FIG. 1 and a layer of adhesive with the microstructured particles or multilayered flakes dispersed in the layer of adhesive.

The multilayered flakes each comprise at least one layer pair, each layer pair comprising one thin film crystalline ferromagnetic metal layer adjacent to one thin film dielectric layer. In the case of flakes having two or more layer pairs, the layer pairs form a stack of alternating ferromagnetic metal layers and dielectric layers. Typically, a dielectric layer comprises both of the outermost layers of the stack.

The flakes are randomly dispersed in the binder, although the flakes are preferably oriented so that the plane of the thin film layers is substantially parallel to the plane of the material.

The flakes have a maximum major dimension in the plane of the thin film layers, which is preferably in the range from about 25 to about 6000 μm. The flake sizes of a plurality of flakes generally occur in a distribution extending from the maximum major dimension to substantially zero. The size distribution of the flakes may be altered by the process used to disperse them in the binder. The thickness of the flakes, i.e., the dimension perpendicular to the plane of the thin film layers, may be chosen to suit a particular application. The ratio of the flake thickness to the maximum major dimension is typically from 1:6 to 1:1000, indicating a flake that is relatively plate-like in shape. This ratio allows a magnetic field oriented in the plane of the flakes to penetrate the ferromagnetic metal layers readily with minimal depolarization.

The number of layer pairs in each flake is preferably at least 2, and more preferably in the range from 2 to about 100. Flakes having from 10 to 75 layer pairs are more preferred.

The ferromagnetic metal layers comprise a crystalline ferromagnetic metal alloy having an intrinsic direct current (DC) permeability of at least 100 relative to free space. Amorphous alloys can be used for this invention but are less desirable because of their greater cost to obtain and process. The alloy preferably comprises NiFe containing at most 80% by weight Fe. The alloy may also include other magnetic or nonmagnetic elements such as Cr, Mo, Cu, and Co, as long as the alloy remains magnetic. Different ferromagnetic metal layers in the same flake may comprise different alloys.

Dielectric layers 18 may be made of any known relatively non-conducting dielectric material. Such materials include SiO, $SiO_2$, $MgF_2$, and other refractory materials, and also may include polymeric materials such as polyimides. The thickness of each dielectric layer 18 is in the range from about 5 to about 100 nm.

The multilayered flakes are layers of two dissimilar materials. In one preferred embodiment, the layers of the multilayered flakes are SiO2 and Ni(80):Fe(20) (permalloy). In addition, the multilayered flakes are nonuniform throughout their depth, being alternating thin films of insulator (SiO2) and magnetic metal (permalloy). The metals of the permalloy are metallic, i.e., in an unoxidized state (0 valence). The metals are not chemically bonded to the SiO2 nonmagnetic spacer layer. In contrast, to the prior art ferrite particles are chemically homogenous and physically uniform throughout the interior of the particle.

The flakes may be made by first depositing a stack of alternating ferromagnetic metal and dielectric layers of the desired materials on a substrate using a known thin film deposition technique, such as electron beam evaporation, thermal evaporation, sputtering, or plating. A preferred method uses electron beam evaporation in a conventionally designed vacuum system incorporating a vacuum compatible web drive assembly, as described in U.S. Pat. No. 5,083,112 (cols. 4-5). The substrate may be, for example, a polyimide, a polyester, or a polyolefin, and is preferably in the form of a flexible web. It is believed that magnetically orienting the ferromagnetic metal layers during deposition by applying an aligning magnetic field to the growing films in the cross web direction may be beneficial for some applications.

After a stack is produced having the desired number of layers, the stack may be removed from the substrate. An effective method of removal includes passing the substrate around a bar with the stack facing away from the bar, the bar having a sufficiently small radius such that the stack delaminates from the substrate. The stack may shatter into flakes having a suitable size as the stack is delaminating. Otherwise, the stack is then broken into flakes having a desired maximum size by a method such as grinding in a hammer mill fitted with an appropriately sized screen. In another method for making flakes, the stack of alternating layers may be deposited on a substrate, which is the same as, or compatible with the binder to be used and the entire stack (including the substrate) is then broken into flakes.

To produce the finished composite, the flakes are then dispersed in the binder using a suitable method such as blending. The mixture is thereafter formed into a configuration such as a tape, a sleeve, a sheet, a rope, pellets, or a specifically configured part by a method such as extrusion, pressing or molding. The configuration may be chosen to suit a particular application.

The quantity of flakes dispersed in the composite is preferably about 0.1 to 10% by volume, and more preferably about 0.3 to 5% by volume.

Efficient coupling of magnetic field energy to the multilayered flakes of the composite layer 32 is achieved when the thickness of the ferromagnetic layer component of the multilayered flakes is less than the skin depth of the electromagnetic field coupling into the layer. The full thickness of each ferromagnetic layer component contributes to the interaction with the magnetic field. The magnetic field is concentrated into the composite layer and the interaction of the magnetic field with the conductive object is thereby reduced.

If the particles or flakes are randomly dispersed, the macroscopic average of the relative magnetic permeability $\mu_s$ of the spacer layer 32 is the spatial and orientation average of the several components of the microscopic relative magnetic permeability tensor $\mu_{ijk}$ of the microstructured particles, taken together with the relative magnetic permeability of the binder $\mu_b$. If the microstructured particles or multilayered flakes are oriented or aligned in the binder, then the relative magnetic permeability of the composite layer 32 may be better represented by a weighted average, with weighting factors accounting for the degree of order in the composite layer 32. For the purpose of the following discussion, assume a random dispersion so that the relative magnetic permeability g of the microstructured particles is represented by a scalar number, and this taken together with the magnetic permeability $\mu_b$ of the binder will combine to give a macroscopic relative magnetic permeability of the spacer layer ($\mu_s$). In this case, the energy in the magnetic field in the presence of the composite layer may be expressed as the volume integral of the product H·B:

$$\text{Magnetic field energy } \epsilon = \tfrac{1}{2} \int H \cdot B \, dV = \tfrac{1}{2} \int \mu_s H^2 dV$$

The magnetic field energy ε is increased in the composite layer 32 in comparison to the magnetic energy in a similarly dimensioned nonmagnetic spacer, such as Fome-Cor™ material included in the Examples, by a factor that is equal to the average relative magnetic permeability $\mu_s$. The net effect of the magnetically permeable composite layer is to confine the magnetic field energy and reduce the amount of energy coupled to the conductive substrate. This results in reduced eddy current induction in the conductive surface, resulting in turn in higher signal returned to the RFID reader.

One example of suitable composite layer 32 is taught in U.S. Pat. No. 5,925,455, "Electromagentic-Power-Absorbing Composite Comprising a Crystalline Ferromagnetic Layer and a Dielectic Layer, Each Having a Specified Thickness," (Bruzzone et al.), which is hereby incorporated by reference. Although the Bruzzone et al. reference teaches that their composite layer is power-absorbing and used for applications to bond two objects together by heating the composite using electromagnetic power and bonding the two objects together by means of melting, fusing or adhesive curing, the inventor of the present invention has discovered new, unexpected properties affiliated with the composite disclosed in the reference. Specifically, the inventor discovered that for some frequencies reserved for radio frequency identification, such as 125 kHz and 13.56 MHz, the composite layer does not operate as a power-absorbing material. Instead, the composite later acts as a magnetic shield material for RFID applications where an RFID tag is on a conductive object, such as a metal object, thus allowing the RFID tag to be successfully read by an RFID reader. In addition, the inventor discovered that the magnetic filed is preferentially concentrated in the composite layer. With reduced magnetic field in the conductive substrate, Eddy currents are not included in the conductive substrate, and the RFID reader sees a higher returned signal from the RFID tag, enabling a successful read of the RFID tag by the RFID reader.

Figure 6:
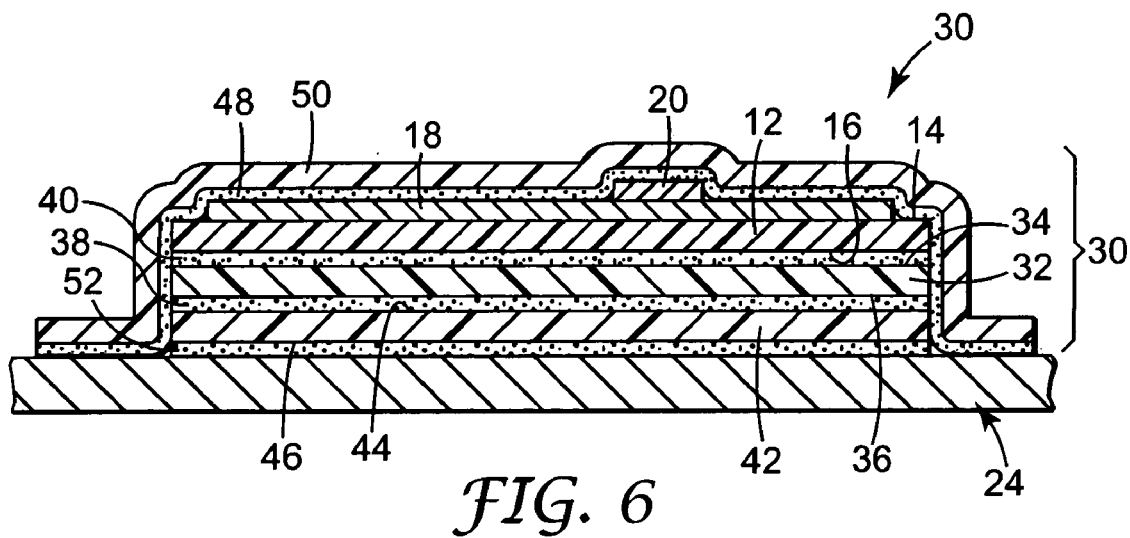
FIG. 6 is a side view of another embodiment of the RFID tag of the present invention.

As illustrated in FIG. 6, the RFID tag 30 may optionally include a cover layer 50. The cover layer 50 may be directly attached to the substrate 12 and/or antenna 18, for example, by lamination. Alternatively, the cover layer 50 may be attached to the substrate 12 and/or antenna 18 by a third layer of adhesive 48, as illustrated in FIG. 6. The cover layer 50 and third layer of adhesive 48 may be useful for attaching the RFID tag 30 to a conductive object 24. The cover layer 50 may extend beyond the substrate 12, for example, it might be a tape that is used to affix the RFID tag 30 to an object. Suitable materials for the cover layer 50 include polyester films or papers. Alternatively, the cover layer 50 and layer of adhesive 48 may be commercially available tape sold by 3M Company, based in St. Paul. The cover layer 50 may be printed or patterned with information, for example, a company logo, an advertisement, or information about the object 24 to which the tag 30 is attached. The printed information may specifically include a bar code or other symbolic representation to allow a visual or optical confirmation of the information pertaining to the RFID tag 30. The cover layer may be stapled or otherwise attached to any item. The cover layer may be wrapped around a handle of luggage, for example, and then attached to itself to attach the RFID tag to the luggage.

In another alternative embodiment, the RFID tag 30 may include multiple composite layers. As illustrated in FIG. 6, the RFID tag may include a second composite layer 42, in addition to the first composite layer 32. However, the RFID tag 30 may include any number of composite layers. The second composite layer 42 could be the same or different from the first composite layer 32, which is described above. For example, the second composite layer 42 may include a different distribution or quantity of multilayered flakes, or a different binder material. The second composite layer 42 includes a first major surface 44 and a second major surface 46 opposite the first major surface. The first composite layer 32 is attached to the second composite layer 42 by the first layer of adhesive 38. The first layer of adhesive is in contact with the second major surface of the first spacer layer 32 and the first major surface 44 of the second composite layer 42. The second composite layer 42 is attached to the conductive object 24 by a fourth layer of adhesive 52. The second major surface 46 of the second composite layer 42 is in contact with the fourth layer of adhesive 52.

Suitable adhesives for the layers of adhesives 38, 40, 48, 52 include a wide range of adhesives known to those skilled in the art, including, for example, those based on natural rubber, acrylate polymers, block copolymers, polyolefins and polyolefin copolymers. Pressure-sensitive adhesives may be preferred in some applications.

Figure 7:
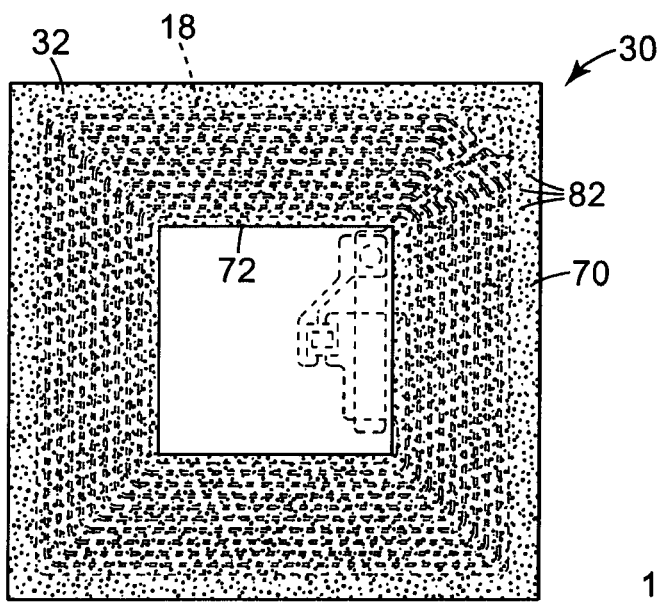
FIG. 7 is a view along line 7-7 in FIG. 5 illustrating yet another embodiment of the RFID tag of the present invention.
Figure 8:
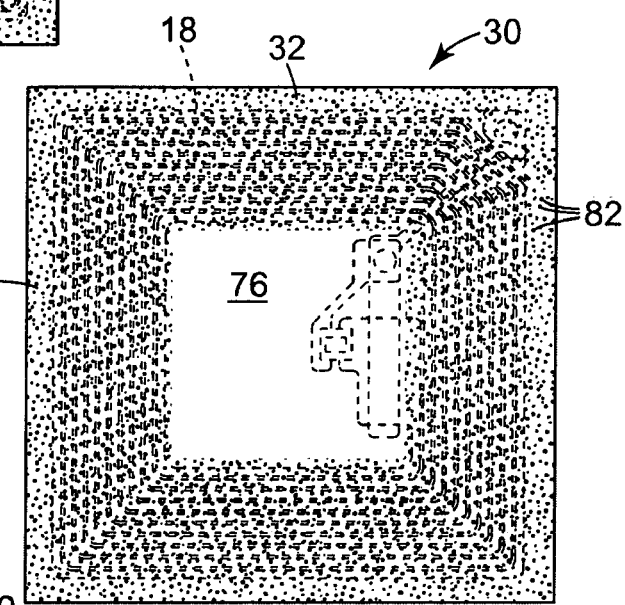
FIG. 8 is a view similar to the view of FIG. 7 illustrating another embodiment of the RFID tag of the present invention.
Figure 9:
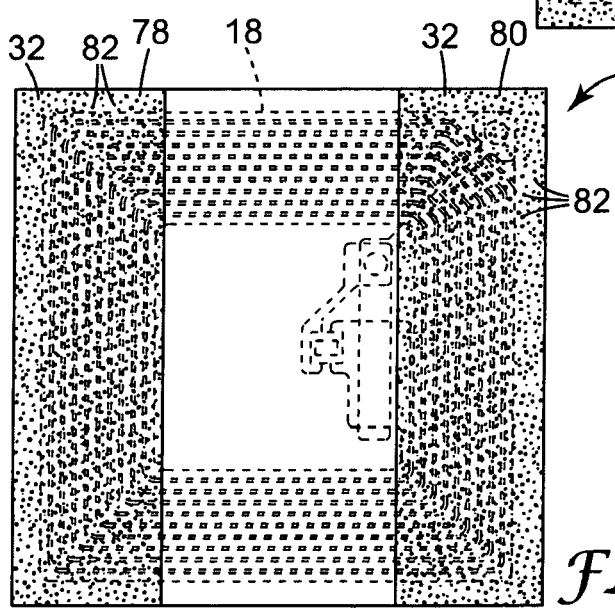
FIG. 9 is a view similar to the view of FIG. 7 illustrating yet another embodiment of the RFID tag of the present invention.

FIGS. 7, 8, and 9 illustrate alternative embodiments of the RFID tag 30 of the present invention. In particular, FIGS. 7, 8, and 9 illustrate different configurations of the composite spacer layer 32. In FIG. 7, the spacer layer 32 includes a first portion 70 that includes the multilayered flakes 82. The spacer layer 32 also includes an aperture or hole 72. The first portion 70 and the aperture 72 is arranged such that the multilayered flakes 82 in the spacer layer 32 corresponds generally to the shape of the antenna 18.

In FIG. 8, the spacer layer 32 includes a first portion 74 and a second portion 76. In the first portion, the binder includes the multilayered flakes 82. In the second portion 76, the binder does not include the multilayered flakes 82. Similar to the embodiment illustrated in FIG. 7, the position of the multilayered flakes 82 correspond generally to the shape of the antenna 18.

In FIG. 9, the spacer layer 32 includes a first portion 78 and a second portion 80. Both the first and second portions 78, 80 include multilayer flakes 82. The first portion 78 and second portion 80 are arranged to correspond generally to only portions of the shape of the antenna 18. In this embodiment the first portion 78 and second portion 80 are two individual strips attached to the second major surface 16 of the substrate 12.

It is advantageous to provide a composite spacer layer 32 where on average, the plane of the multilayered flakes 82 are aligned with the plane of the RFID antenna 18 to minimize demagnetization effects. Further, in these embodiments, less of the composite material or multilayered flakes is required, making the RFID tag less costly. FIGS. 7, 8, and 9 illustrate just three possible configurations of the composite spacer layer 32. However, any number of configurations or designs are contemplated so as to provide a spacer layer 32 where the spacer layer has some portion having multilayered particles 82 and where this portion is aligned with at least one portion of the RFID antenna 18.

The operation of the present invention will be further described with regard to the following detailed examples. These examples are offered to further illustrate the various specific and preferred embodiments and techniques. It should be understood, however, that many variations and modifications may be made while remaining within the scope of the present invention.

For all of the examples below, the RFID transponders used were Texas Instruments (TI), Inc. radio frequency identification Tag-It™ HF-I ISO-15693 (International Standards Organization) compliant transponder inlays with a 48 millimeter by 48 millimeter antenna available from Texas Instruments, Inc., Dallas, Tex. The RFID reader used to read the RFID transponders in all of the examples was a TEK Protégé-Tungsten™ handheld reader adapter from TEK Industries, Inc., Vernon, Conn. The TEK Protégé-Tungsten™ handheld reader adapter from TEK Industries, Inc., was attached per the design selection of TEK Industries to a PalmOne™ Tungsten C personal digital assistant (PDA) available from PalmOne™, Milpitas, Calif.

To establish the readability of the TI transponders by the TEK Protégé-Tungsten™ handheld reader adapter attached to a PalmOne™ Tungsten C PDA, the TI transponders were read in free space, i.e., the transponders were not attached to metal, nor were they attached to any other RF absorbers. Using the TEK Protégé-Tungsten™ handheld reader adapter attached to a PalmOne™ Tungsten C PDA, hereinafter referred to as the TEK RFID reader, the TI transponders were read at a distance of up to 112 millimeters measured from the RFID reader.

Then, the TI transponders were mounted directly on an aluminum plate, i.e. no set off distance between the TI transponder and the aluminum plate, nor was there any other RF absorbers placed between the TI transponder and the aluminum plate, and the TI transponders were not readable using the TEK RFID reader.

COMPARATIVE EXAMPLE 1

For this comparative example, a polystyrene display board was used as a set off spacer layer between the TI transponder and an aluminum plate to provide distance between the TI transponder and the aluminum plate, but yet provide a configuration in which the TI transponder was affixed to the aluminum plate. The transponder was affixed to the display board and the display board in turn was affixed to the aluminum plate as follows. 3M™ double-sided adhesive tape available from 3M Company, St. Paul, Minn., was laminated to the side of the TI transponder opposite the side upon which the RFID integrated circuit was affixed. The TI transponder with the double sided adhesive tape was then adhered by the tape to a 55 millimeter by 55 millimeter piece of Fome-Cor® polystyrene display board 5.08 millimeters thick available from Alcan Composites USA Inc., St. Louis, Mo. The mass of this piece of display board was 1.79 grams. The display board with attached transponder was then attached to an aluminum plate using 3M™ double-sided adhesive tape laminated to the side of the display board opposite the side to which the transponder had been attached. Using the TEK RFID reader, the transponder was read at a distance of up to 53 millimeters measured from the RFID reader.

COMPARATIVE EXAMPLE 2

In this comparative example, all elements were the same as in Comparative Example 1 except that the polystyrene display board used as a spacer layer was 2.413 millimeters thick, and thus had a mass of 0.86 grams. Using the TEK RFID reader, the transponder was read at a distance of up to 39 millimeters measured from the RFID reader.

COMPARATIVE EXAMPLE 3

In this comparative example, the spacer layer was a 0.991 millimeter thick layer of iron filled silicone polymer magnetic absorber available under the tradename of Eccosorb™ GDS material from Emerson & Cuming, Randolph, Mass. The length and width of the magnetic absorber layer was 51 millimeters by 51 millimeters and had a mass of 6.89 grams. The transponder and the attachment method of transponder to the magnetic absorber and then to an aluminum plate were the same as described in Comparative Example 1. Using the TEK RFID reader, the transponder was read at a distance of up to 39 millimeters measured from the RFID reader.

EXAMPLE 4

In this example, a composite layer of the present invention was used as the spacer layer. The micro structured particle composite layer used as the spacer layer in this example was formed from two thinner sheets of the composite film laminated together with 3M™ Post-IT™ double-sided adhesive tape. The resultant spacer layer was 55 millimeters by 55 millimeters with a total thickness (two film layers and an interlayer tape layer) of 0.813 millimeters and a mass of 2.49 grams. The transponder was attached to the composite film spacer layer and the combination of the composite film spacer layer and transponder were in turn attached to the aluminum plate as set forth in Comparative Example 1. Using the TEK RFID reader, the transponder was read at a distance of up to 40 millimeters measured from the RFID reader.

COMPARATIVE EXAMPLE 5

In this comparative example, all elements were the same as in Comparative Example 1 except that the spacer layer was composed of 8 sheets of plain white 20-pound paper. The plain paper spacer layer comprised of 8 sheets of paper had a thickness of 0.813 millimeters and the length and width dimensions were cut to 55 millimeters by 55 millimeters. The resultant paper spacer layer had a mass of 1.98 grams. Using the TEK RFID reader, the transponder was read at a distance of up to 20 millimeters measured from the RFID reader.

The results of the transponder read ranges relative to the type of spacer layer used over a metal surface in each of the above examples is set forth in the following Table.

| Example No. | Spacer Layer Construction | Length Width Dimensions (mm) | Thickness (mm) | Mass (gr.) | Areal Density (gm/mm$^2$) | Read Range on Metal (mm) |
|---|---|---|---|---|---|---|
| C1 | Fome-Cor ™ material | 55 × 55 | 5.080 | 1.79 | 0.59 × 10$^{-3}$ | 53 |
| C2 | Fome-Cor ™ material | 55 × 55 | 2.413 | 0.86 | 0.28 × 10$^{-3}$ | 39 |
| C3 | Eccosorb ™ GDS material | 51 × 51 | 0.991 | 6.89 | 2.65 × 10$^{-3}$ | 39 |
| 4 | composite layer of the present invention | 55 × 55 | 0.813 | 2.49 | 0.82 × 10$^{-3}$ | 40 |
| C5 | Paper | 55 × 55 | 0.813 | 1.98 | 0.65 × 10$^{-3}$ | 20 |

As denoted by the results presented in the above table, RFID transponders mounted on a composite layer of the present invention and affixed to a conductive surface were readable at a comparable read range to RFID transponders mounted on prior art shield layer materials, such as Eccosorb™ material, that was also affixed to a conductive surface. The composite layer of the present invention included a comparable thickness, but approximately one third the mass, compared to the Eccosorb™ material. Further, RFID transponders mounted on a composite layer of the present invention and affixed to a conductive surface provided a comparable read range to an RFID transponder mounted on spacer layer materials, such as Fome-Cor™ material that was also affixed to a conductive surface. The composite layer of the present invention included a slightly higher mass, but a significantly lower thickness, compared to the Fome-Cor™ material.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A radio frequency identification ("RFID") tag, comprising:
    a substrate including a first major surface and a second major surface opposite the first major surface;
    an antenna attached to the first major surface of the substrate;
    an integrated circuit attached to the antenna; and
    a first composite layer including a first major surface and a second major surface opposite the first major surface, wherein the first composite layer is attached to the second major surface of the substrate, wherein the first composite layer comprises:
    binder; and
    a plurality of multilayered flakes dispersed in the binder, the multilayered flakes comprising two to about 100 layer pairs, each layer pair comprising: one crystalline ferromagnetic metal layer adjacent to one dielectric layer, wherein the layer pairs form a stack of alternating ferromagnetic metal layers and dielectric layers.

2. The RFID tag of claim 1, wherein the ferromagnetic metal layer is thinner than its skin depth.

3. The RFID tag of claim 1, wherein the dielectric layer has a thickness of about 5 to about 100 nm.

4. The RFID tag of claim 1, wherein the first composite layer includes a thickness of between 0.5 and 5.0 mm.

5. The RFID tag of claim 1, wherein the composite layer includes an areal density of between 0.0001 and 0.1 gm/mm$^2$.

6. The RFID tag of claim 1, wherein the composite layer comprises at least two strips of the composite layer attached to the second major surface of the substrate.

7. The RFID tag of claim 1, wherein the composite layer includes an aperture, wherein the aperture corresponds generally to the shape of the antenna.

8. The RFID tag of claim 1, wherein the composite layer includes a first portion and a second portion, wherein the second portion corresponds generally to the shape of the antenna, and wherein the first portion comprises the binder and the plurality of multilayered flakes dispersed in the binder, wherein the second portion comprises only binder.

9. The RFID tag of claim 1, further comprising a first layer of adhesive attached to the second major surface of the composite layer.

10. The RFID tag of claim 9, wherein the first layer of adhesive attaches the radio frequency identification tag to a metal or other conductive surface.

11. The RFID tag of claim 9, further comprising a second layer of adhesive attaching the second major surface of the substrate to the first major surface of the composite layer.

12. The RFID tag of claim 1, further comprising a cover layer attached to the substrate and the composite layer.

13. The RFID tag of claim 12, further comprising a third layer of adhesive between the cover layer and the substrate.

14. The RFID tag of claim 1, further comprising a second composite layer including a first major surface and a second major surface opposite the first major surface, wherein the second composite layer is attached to the second major surface of the first composite layer, wherein the second composite layer comprises:
    binder; and
    a plurality of multilayered flakes dispersed in the binder, the multilayered flakes comprising two to about 100 layer pairs, each layer pair comprising: one crystalline ferromagnetic metal layer adjacent to one dielectric layer, wherein the layer pairs form a stack of alternating ferromagnetic metal layers and dielectric layers.

15. The RFID tag of claim 14, further comprising a fourth layer of adhesive attaching the second major surface of the first composite layer to the first major surface of the second composite layer.

16. The RFID tag of claim 15, wherein the fourth layer of adhesive attaches the RFID tag to a metal or other conductive surface.

17. A metal airplane part or tool in combination with the RFID tag of claim 1, wherein the RFID tag is attached to the airplane part or tool, and wherein the RFID tag is readable by an interrogator within a read range of at least 40 mm.

18. A radio frequency identification ("RFID") tag for use on metal or other conductive surfaces, comprising:
    a substrate including a first major surface and a second major surface opposite the first major surface;
    an antenna attached to the first major surface of the substrate;
    an integrated circuit attached to the antenna; and
    a first composite layer including a first major surface and a second major surface opposite the first major surface, wherein the first composite layer is attached to the second major surface of the substrate, wherein the first composite layer comprises:
    binder; and
    a plurality of multilayered flakes dispersed in the binder, the multilayered flakes comprising two to about 100 layer pairs, each layer pair comprising: one crystalline ferromagnetic metal layer adjacent to one dielectric layer, wherein the layer pairs form a stack of alternating ferromagnetic metal layers and dielectric layers;

wherein the radio-frequency identification tag is attached to the metal or other conductive surface, and wherein the radio frequency identification tag is readable by an interrogator within a read range of at least 40 mm from the radio frequency identification tag.

19. The method of claim 18, wherein the ferromagnetic metal layer is thinner than its skin depth.

20. The method of claim 18, wherein the dielectric layer has a thickness of about 5 to 100 nm.

21. The RFID tag of claim 18, wherein the first composite layer includes a thickness of 0.5 and 5.0 mm.

22. The RFID tag of claim 18, wherein the composite layer includes an areal density of between 0.0001 and 0.1 gm/mm$^2$.

23. The RFID tag of claim 18, wherein the composite layer comprises at least two strips of the composite layer attached to the second major surface of the substrate.

24. The RFID tag of claim 18, wherein the composite layer includes an aperture, wherein the aperture corresponds generally to the shape of the antenna.

25. The RFID tag of claim 18, wherein the composite layer includes a first portion and a second portion, wherein the second portion corresponds generally to the shape of the antenna, and wherein the first portion comprises the binder and the plurality of multilayered flakes dispersed in the binder, wherein the second portion comprises only binder.

26. The RFID tag of claim 18, further comprising a first layer of adhesive attached to the second major surface of the composite layer.

27. The RFID tag of claim 26, wherein the first layer of adhesive attaches the radio frequency identification tag to a metal or other conductive surface.

28. The RFID tag of claim 26, further comprising a second layer of adhesive attaching the second major surface of the substrate to the first major surface of the composite layer.

29. The RFID tag of claim 18, further comprising a cover layer attached to the substrate and the composite layer.

30. The RFID tag of claim 29, further comprising a third layer of adhesive between the cover layer and the substrate.

31. The RFID tag of claim 18, further comprising a second composite layer including a first major surface and a second major surface opposite the first major surface, wherein the second composite layer is attached to the second major surface of the first composite layer, wherein the second composite layer comprises:

binder; and a plurality of multilayered flakes dispersed in the binder, the multilayered flakes comprising two to about 100 layer pairs, each layer pair comprising: one crystalline ferromagnetic metal layer adjacent to one dielectric layer, wherein the layer pairs form a stack of alternating ferromagnetic metal layers and dielectric layers.

32. The RFID tag of claim 31, further comprising a fourth layer of adhesive attaching the second major surface of the first composite layer to the first major surface of the second composite layer.

33. The RFID tag of claim 32, wherein the fourth layer of adhesive attaches the RFID tag to a metal or other conductive surface.

34. A metal airplane part or tool in combination with the RFID tag of claim 18, wherein the RFID tag is attached to the airplane part or tool, and wherein an interrogator may read the RFID tag within a read range of at least 40 mm.

35. A method of manufacturing a radio frequency identification ("RFID") tag, comprising the steps of:

providing a substrate containing an antenna on at least one surface of the substrate;

attaching an integrated circuit to the antenna;

providing a first composite layer including a first major surface and a second major surface opposite the first major surface, wherein the first composite layer is attached to the second major surface of the substrate, wherein the first composite layer comprises:

binder; and a plurality of multilayered flakes dispersed in the binder, the multilayered flakes comprising two to about 100 layer pairs, each layer pair comprising: one crystalline ferromagnetic metal layer, wherein the ferromagnetic metal layer is thinner than its skin depth, adjacent to one dielectric layer, wherein the dielectric layer has a thickness of about 5 to about 100 nm; and wherein the layer pairs form a stack of alternating ferromagnetic metal layers and dielectric layers; and attaching the first composite layer to the substrate opposite the antenna and integrated circuit.

* * * * *

UNITED STATES PATENT AND TRADEMARK OFFICE
CERTIFICATE OF CORRECTION

PATENT NO.         : 7,315,248 B2
APPLICATION NO. : 11/128713
DATED                : January 1, 2008
INVENTOR(S)      : William C. Egbert It is certified that error appears in the above-identified patent and that said Letters Patent is hereby corrected as shown below:

Column 1
Line 31, Delete "Contacing" and insert -- Contacting --, therefor.

Column 2
Line 54, Delete "naphthanate," and insert -- naphthenate, --, therefor.

Column 5
Line 64, Delete "Contacing" and insert -- Contacting --, therefor.

Column 9
Line 42, Delete "SiO2" and insert -- $SiO_2$ --, therefor.
Line 45, Delete "SiO2" and insert -- $SiO_2$ --, therefor.
Line 47, Delete "SiO2" and insert -- $SiO_2$ --, therefor.

Column 10
Line 46, Delete "g" and insert -- μ --, therefor.

Column 14
Line 5 (Approx.), Delete "tradename" and insert -- trade name --, therefor.

Signed and Sealed this

Twelfth Day of August, 2008

JON W. DUDAS
*Director of the United States Patent and Trademark Office*